(12) United States Patent
Rijskamp et al.

(10) Patent No.: US 8,094,998 B2
(45) Date of Patent: Jan. 10, 2012

(54) DEVICE FOR MAKING A BEVERAGE, PROVIDED WITH A WATER BOILER

(75) Inventors: Peter Rijskamp, Hoogeveen (NL); Johan Kuiper, Hoogeveen (NL); Hendrik Post, Bildtzijl (NL); Henk Smitt, Hoogeveen (NL); Edwin Wilco Drost, Hoogeveen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 593 days.

(21) Appl. No.: 12/067,433

(22) PCT Filed: Sep. 4, 2006

(86) PCT No.: PCT/IB2006/053094
§ 371 (c)(1),
(2), (4) Date: Mar. 19, 2008

(87) PCT Pub. No.: WO2007/034343
PCT Pub. Date: Mar. 29, 2007

(65) Prior Publication Data
US 2008/0247740 A1    Oct. 9, 2008

(30) Foreign Application Priority Data
Sep. 19, 2005 (EP) .................................. 05108585

(51) Int. Cl.
*F24H 1/20* (2006.01)
*H05B 3/78* (2006.01)

(52) U.S. Cl. ......... 392/451; 392/448; 392/453; 392/497

(58) Field of Classification Search ................. None
See application file for complete search history.

(56) References Cited

U.S. PATENT DOCUMENTS

| | | | | | |
|---|---|---|---|---|---|
| 1,714,607 | A | * | 5/1929 | Manierre | 219/208 |
| 2,266,216 | A | * | 12/1941 | Kimberlin | 392/489 |
| 2,533,615 | A | * | 12/1950 | Osterheld | 392/501 |
| 3,176,115 | A | * | 3/1965 | Balis | 204/196.16 |
| 3,351,239 | A | * | 11/1967 | Flock | 222/54 |
| 3,450,860 | A | * | 6/1969 | Kneisley | 392/498 |
| 3,730,144 | A | * | 5/1973 | Arzberger | 122/14.22 |
| 4,424,767 | A | * | 1/1984 | Wicke et al. | 122/13.3 |
| 4,484,243 | A | * | 11/1984 | Herbst et al. | 361/50 |
| 4,637,347 | A | * | 1/1987 | Troy | 122/15.1 |
| 4,680,446 | A | * | 7/1987 | Post | 392/451 |
| 4,871,089 | A | * | 10/1989 | Rader et al. | 222/54 |
| 4,874,104 | A | * | 10/1989 | Klammer et al. | 220/4.21 |
| 4,924,069 | A | * | 5/1990 | Giordani | 392/485 |
| 6,659,048 | B1 | * | 12/2003 | DeSantis et al. | 122/20 R |
| 7,503,288 | B2 | * | 3/2009 | Hendler et al. | 122/15.1 |

FOREIGN PATENT DOCUMENTS

| | | |
|---|---|---|
| DE | 1951374 | 4/1971 |
| DE | 2348336 | 4/1975 |
| EP | 262273 | 4/1988 |

(Continued)

*Primary Examiner* — Thor Campbell
(74) *Attorney, Agent, or Firm* — Sherry Austin

(57) ABSTRACT

A device for making a predetermined quantity of a hot beverage includes a boiler chamber for heating water and a tubular heating element inside the boiler chamber near the bottom of the boiler chamber. A main portion of the tubular heating element extends along a helical line around a horizontal axis. The bottom of the boiler chamber includes a wall substantially having the shape of a part of cylindrical surface around the horizontal axis.

11 Claims, 1 Drawing Sheet

FOREIGN PATENT DOCUMENTS

| | | |
|---|---|---|
| EP | 1081986 A2 | 3/2001 |
| EP | 1502532 | 2/2005 |
| GB | 2176055 | 5/1986 |
| JP | 2004055330 | 1/1988 |
| JP | 63264885 | 2/2004 |
| WO | 2004084689 | 3/2004 |

* cited by examiner

DEVICE FOR MAKING A BEVERAGE, PROVIDED WITH A WATER BOILER

The invention is related to a device for making a predetermined quantity of a hot beverage, provided with a boiler chamber for heating water and a tubular heating element inside the boiler chamber near the bottom of the boiler chamber. The hot beverage can be coffee, or tea, or chocolate, or any other beverage whereby hot water is transported to a brewing chamber for making the hot beverage, or the hot beverage can be heated water, for example to make tea after the hot water has left the device.

In general, a device for producing a hot beverage is provided with means for heating water, which means may comprise a flow-through heater, whereby cold water is heated while it is flowing through the heater to the brewing chamber. Thereby, the heating element is switched on when the water is flowing and is switched off when there is no water flowing through the heater. The invention is not related to such flow-through heater, but is related to a heater whereby the water is heated in a boiler chamber while it is in rest and waiting for being transported to the brewing chamber.

Such device is described in EP-A-1502532, which device is a coffee making apparatus provided with a boiler chamber comprising a tubular heating element, whereby a main portion of the tubular heating element is wound into a substantial helical coil around a vertical axis, which helical coil is positioned in the lower part of the boiler chamber.

For brewing a predetermined quantity of a hot beverage, the boiler chamber must have at least a certain content, which content corresponds with said predetermined quantity of the hot beverage to be brewed. But, preferably, the content of the boiler chamber is as small as possible, in order to shorten the period of time that is necessary for heating the water up to the required temperature. At the other hand, the content of the boiler chamber must be large enough to accommodate the tubular heating element.

The tubular heating element is preferably a sheathed heater, comprising a tube of heat conductive material such as stainless steel or aluminum, and an electric resistance wire inside the tube, which wire is helically wound into a coil, whereby the coil is embedded in an electric insulating material, which material is heat conductive, for example magnesium oxide. In practice, the main part of the tubular heating element has a spiral shape or a helical shape, having a vertical axis. In case of a spiral shape, said main part of the heating element can be located close to the bottom of the boiler chamber, but in case of a helical shape, only the lower turn of the coil can be located near the bottom of the boiler chamber. Such helical shape of the heating element results in a less effective heating of the water, because the heating of the water should preferably take place near the bottom of the boiler chamber near the location where the cold water enters the boiler chamber.

The main part of the tubular heating element is curved, whereby the radius of the curve may not be smaller than a certain value, which value depends on the specification of the tubular heating element. When the tubular heating element is wound into a helical coil, that coil must have at least a certain diameter, and when the heating element is wound into a spiral, the inner turn of the spiral must have that certain diameter. Therefore, the minimum dimension of the horizontal cross section of at least the lower part of the boiler chamber is determined by the minimum radius in which the heating element can be curved. Furthermore, the boiler chamber needs to have a substantial vertical dimension (height) in order to achieve an appropriate water flow through the boiler chamber when hot water is leaving the boiler chamber at the upper side and cold water enters the boiler chamber from below, whereby mixing of the cold water and the hot water should be limited. All these requirements result in a relative large content of the boiler chamber.

An object of the invention is a device for making a beverage, provided with a boiler chamber for heating water and a tubular heating element inside the boiler chamber near the bottom of the boiler chamber, whereby the horizontal cross section of the lower part of the boiler chamber has a relative small dimension.

Another object of the invention is a device for making a beverage, provided with a boiler chamber for heating water and a tubular heating element inside the boiler chamber near the bottom of the boiler chamber, whereby the heating element has a helical shape, and whereby a main portion of the heating element is located near the bottom of the boiler chamber.

To accomplish with one or both of said objects, a main portion of the tubular heating element extends along a substantial helical line around a substantial horizontal axis. When the axis of the helically wound tubular heating element is horizontal, the length of the coil determines the minimal dimension of the horizontal cross section of the lower part of the boiler chamber, and the helical coil can be designed in such way that its length is smaller than its diameter. Furthermore, when the axis of the helical wound heating element is positioned substantial horizontal, a substantial part of the heating element is located near the bottom of the boiler chamber.

In a preferred embodiment, the bottom of the boiler chamber comprises a wall having substantially the shape of a part of a cylindrical surface around said horizontal axis. Having such shape, the bottom wall of the boiler chamber can be located close to half of the coil shaped part of the tubular heating element, so that a substantial portion of the heating operation of the water in the boiler takes place near the bottom of the boiler chamber.

Preferably, the water inlet of the boiler chamber is located along substantially the arc of a circle at one end of said cylindrical surface of the bottom of the boiler chamber. Thereby, the water flow enters the boiler chamber in the lowest portion of the boiler chamber, underneath the coil of the heating element, so that an effective heating up of the cold water flowing into the boiler chamber can take place.

In a preferred embodiment, one end portion and preferably both end portions of the tubular heating element are extending through the higher wall (upper wall) of the boiler chamber, so that the connection means for supplying electric power to the heating element is located at the upper side of the boiler chamber. One of these end portions, but preferably one end portion and more preferably both end portions of the tubular heating element comprise a fuse for interrupting the electric current flowing through the tubular heating element when the temperature of the heating element increases above a predetermined value. When, for example, the boiler chamber is not completely filled with water, the higher part of the heating element, i.e. both said two end portions, cannot transfer heat to the water, so that the temperature of said higher part will become too high. By locating the fuses in said higher part of the heating element, the temperature of the fuses will increase together with the highest temperature of the heating element, so that they can disconnect the heating element in time. Preferably, for safety reasons there are two fuses, one in each end portion of the tubular heating element, so that the chance of failure is reduced to a minimum. A fuse in the end portion of a tubular heating element is disclosed in EP-A-1081986.

Preferably, one end portion and more preferably both end portions of the tubular heating element are substantially straight and are positioned inside the boiler chamber in a substantial vertical direction, in order to obtain an optimal position of the two fuses, one fuse in each end portion. Preferably, both straight end portions of the tubular heating element substantially extend from the higher wall (upper wall) of the boiler chamber to a horizontal plane through the axis of the helical shape of the tubular heating element. Thereby, an effective configuration of the tubular heater element is obtained, whereby a relative long straight portion is present.

In a preferred embodiment, the content of the boiler chamber is less than the quantity of hot beverage to be brewed. In case different quantities of hot beverage can be brewed, the content of the boiler chamber is less than the largest quantity of hot beverage that can be brewed. Therefore, the temperature of the water that is supplied to the brewing chamber decreases after a certain pumping time, which may be desired in order to achieve an appropriate extraction operation in the brewing chamber.

The invention is furthermore related to a method for making a predetermined quantity of a hot beverage, whereby water is heated in a boiler chamber, which boiler chamber comprises a tubular heating element near the bottom of the boiler chamber, and whereby a main portion of the tubular heating element extends inside the boiler chamber along a substantial helical line around a substantial horizontal axis.

The invention will now be further elucidated by means of a description of a boiler for heating water in a beverage making device, comprising a boiler chamber and a tubular heating element inside the boiler chamber, whereby reference is made to the drawing comprising two figures, in which.

The two figures are only diagrammatic representations, whereby only parts that are relevant for the elucidation of the invention are represented.

Figure 1:
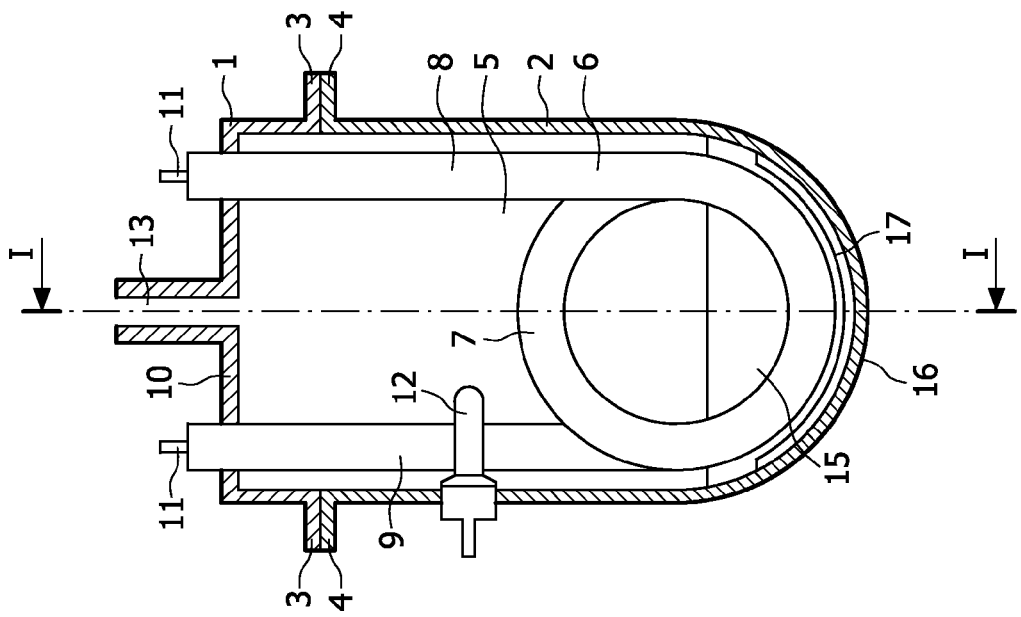
FIG. 1 is a sectional view of the boiler along the line I-I in FIG. 2.
Figure 2:
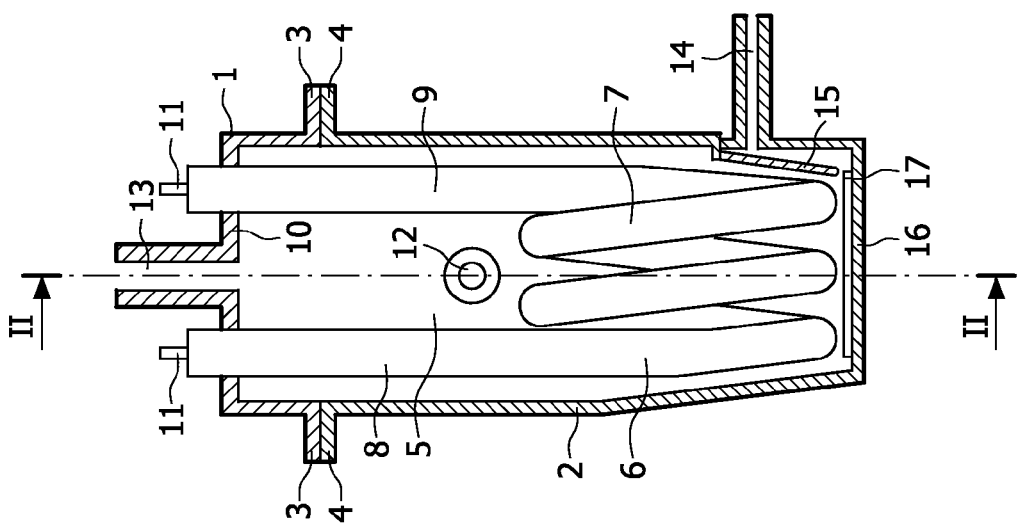
FIG. 2 is a sectional view of the boiler along the line II-II in FIG. 1.

Both figures show a vertical cross section of the boiler, which two cross sections are positioned perpendicular with respect to each other. The boiler comprises a housing having an upper part 1 and a lower part 2, which two parts 1,2 are attached to each other through respective flanges 3,4, so that they form a watertight container. The housing 1,2 encloses the boiler chamber 5. Inside the boiler chamber 5 is a tubular heating element 6, which heating element 6 is not represented in a cross sectional view, but is represented in side view (FIG. 1) and in front view (FIG. 2).

The main portion 7 of the heating element 6 is wound into a helical shape around a horizontal axis. The two end portions 8,9 of the tubular heating element 6 are straight and are extending in vertical direction to the upper wall 10, which upper wall 10 is a portion of the upper part 1 of the housing of the boiler. The end portions 8,9 are passing through holes in the upper wall 10, so that they reach outside the boiler chamber 5. Wires for supplying electric power can be connected to the contact members 11 of the heating element 6.

Each straight end portion 8,9 of the tubular heating element 6 can accommodate a fuse, in order to switch off the electric current through the heating element 6 when the heating element 6 becomes too hot, for example in case no water, or not enough water, is present in the boiler chamber 5.

The temperature of the water in the boiler chamber 5 is detected by means of a temperature sensor 12, reaching through the wall of the lower part 2 of the housing, at about the level of the higher side of the helical shaped part 7 of the heating element 6. Sensor 12 can be a bimetal sensor for switching off the power supply to the heating element 6 when the temperature of the water in the boiler chamber 5 is above a predetermined value, for example 95°. Sensor 12 can also be a detector for measuring the temperature of the water in the boiler chamber 5 in order to control the heating operation.

In order to supply hot water to the brewing chamber of the beverage making device, the heated water can leave the boiler chamber 5 through water outlet 13 at the upper side of the boiler, whereby cold water is pumped into the boiler chamber 5 through water inlet 14 near the lower side of the boiler. Thereby, the cold water entering the boiler chamber 5 is guided by guiding plate 15 towards the bottom wall 16 of the boiler chamber 5, which bottom wall 16 has a half cylindrical shape, as is shown in FIG. 2. Between the bottom wall 16 and the edge of guiding plate 15 is a water passage 17 having the shape of an arc of a circle, so that the cold water enters the boiler chamber 5 near the bottom wall 16 underneath the helically shaped part 7 of the tubular heating element 6.

The embodiment of a boiler for a device for making a predetermined quantity of a hot beverage as described above is only an example; many other embodiments are possible.

The invention claimed is:

1. A device for making a predetermined quantity of a hot beverage, the device comprising:
   a boiler chamber for heating water; and
   a tubular heating element inside the boiler chamber near a bottom of the boiler chamber,
   wherein a main portion of the tubular heating element has a helical shape and extends along a helical line around a horizontal axis,
   wherein at least one end portion of the tubular heating element extends inside the boiler chamber above the main portion along a vertical axis by an amount which is at least same as a diameter of the main portion of the tubular heating element along the vertical axis,
   wherein the bottom of the boiler chamber comprises a wall substantially having a shape of a part of cylindrical surface around said horizontal axis, and
   wherein a water inlet of the boiler chamber is located along substantially an arc of a circle at one end of said cylindrical surface.

2. The device as claimed in claim 1, wherein the at least one end portion of the tubular heating element extends through a wall of the boiler chamber.

3. The device as claimed in claim 1, wherein the at least one end portion of the tubular heating element comprises a fuse for interrupting electric current flowing through the tubular heating element when temperature of the heating element increases above a predetermined value.

4. The device as claimed in claim 2, wherein the at least one end portion of the tubular heating element is substantially straight and is positioned in the vertical direction.

5. The device as claimed in claim 1, wherein content of the boiler chamber is less than the quantity of the hot beverage to be brewed.

6. A method for making a predetermined quantity of a hot beverage, comprising the acts of:
   providing water to a boiler chamber through an inlet of the boiler chamber;
   heating the water in the boiler chamber using a tubular heating element located in the boiler chamber near a bottom of the boiler chamber; and
   outputting the heated water from an outlet of the boiler chamber for making the predetermined quantity of the hot beverage, wherein a main portion of the tubular heating element has a helical shape and extends along a helical line around a horizontal axis, wherein at least one end portion of the tubular heating element extends inside the boiler chamber above the main portion along a vertical axis by an amount which is at least same as a diameter of the main portion of the tubular heating element along the vertical axis, and wherein a guiding plate is configured to guide the water entering the boiler chamber towards a bottom wall of the boiler chamber underneath the main portion of the tubular heating element.

7. The device of claim 1, wherein the main portion of the tubular heating element has a length along the horizontal axis, the length being smaller than the diameter.

8. A device for making a predetermined quantity of a hot beverage, the device comprising:

a boiler chamber for heating water;

a tubular heating element inside the boiler chamber near a bottom of the boiler chamber, wherein a main portion of the tubular heating element has a helical shape and extends along a helical line around a horizontal axis; and a guiding plate for guiding the water entering the boiler chamber towards a bottom wall of the boiler chamber underneath the main portion of the tubular heating element, wherein at least one end portion of the tubular heating element extends inside the boiler chamber above the main portion along a vertical axis by an amount which is at least same as a diameter of the main portion of the tubular heating element along the vertical axis.

9. The device of claim 8, wherein between the bottom wall and an edge of the guiding plate is a water passage having a shape of an arc of a circle.

10. The method of claim 6, wherein the main portion of the tubular heating element has a length along the horizontal axis, the length being smaller than the diameter.

11. The method of claim 6, wherein between the bottom wall and an edge of the guiding plate is a water passage having a shape of an arc of a circle.

* * * * *